United States Patent [19]

DeSmet et al.

[11] Patent Number: 5,794,653
[45] Date of Patent: Aug. 18, 1998

[54] WATER SHUT-OFF VALVE AND CONTROL SYSTEM

[75] Inventors: Charles R. DeSmet; Robert C. Williams, III, both of Raleigh, N.C.

[73] Assignee: Charles DeSmet, Raleigh, N.C.

[21] Appl. No.: 845,351

[22] Filed: Apr. 25, 1997

[51] Int. Cl.⁶ ............................................. F16K 31/12
[52] U.S. Cl. ............................... 137/486; 137/487.5
[58] Field of Search ........................... 137/460, 462, 137/486, 487.5, 624.12, 624.15

[56] References Cited

U.S. PATENT DOCUMENTS

| | | | |
|---|---|---|---|
| 3,850,199 | 11/1974 | Stone et al. | 137/460 |
| 4,518,955 | 5/1985 | Meyer | 137/460 |
| 4,630,799 | 12/1986 | Nolan et al. | 137/460 |
| 4,735,231 | 4/1988 | Jacquet | 137/486 |
| 4,736,736 | 4/1988 | Britton et al. | 137/460 |
| 4,794,947 | 1/1989 | Kuramochi | 137/486 |
| 5,007,453 | 4/1991 | Berkowitz et al. | 137/487.5 |
| 5,083,744 | 1/1992 | Reinicket et al. | 137/487.5 |
| 5,086,806 | 2/1992 | Engler et al. | 137/487.5 |
| 5,474,105 | 12/1995 | Able et al. | 137/462 |

Primary Examiner—Denise L. Ferensic
Assistant Examiner—Joanne Y. Kim
Attorney, Agent, or Firm—Kane, Dalsimer, Sullivan, Kurucz, Levy, Eisele and Richard

[57] ABSTRACT

A water distribution system protects against water leaks by shutting off the water if a pre-determined flow is detected for more than a set period of time. The time may be changed to any value between one minute and four or more hours. When the pre-determined flow continues past the set time, the main shut off will activate for two seconds, closing the system.

13 Claims, 8 Drawing Sheets

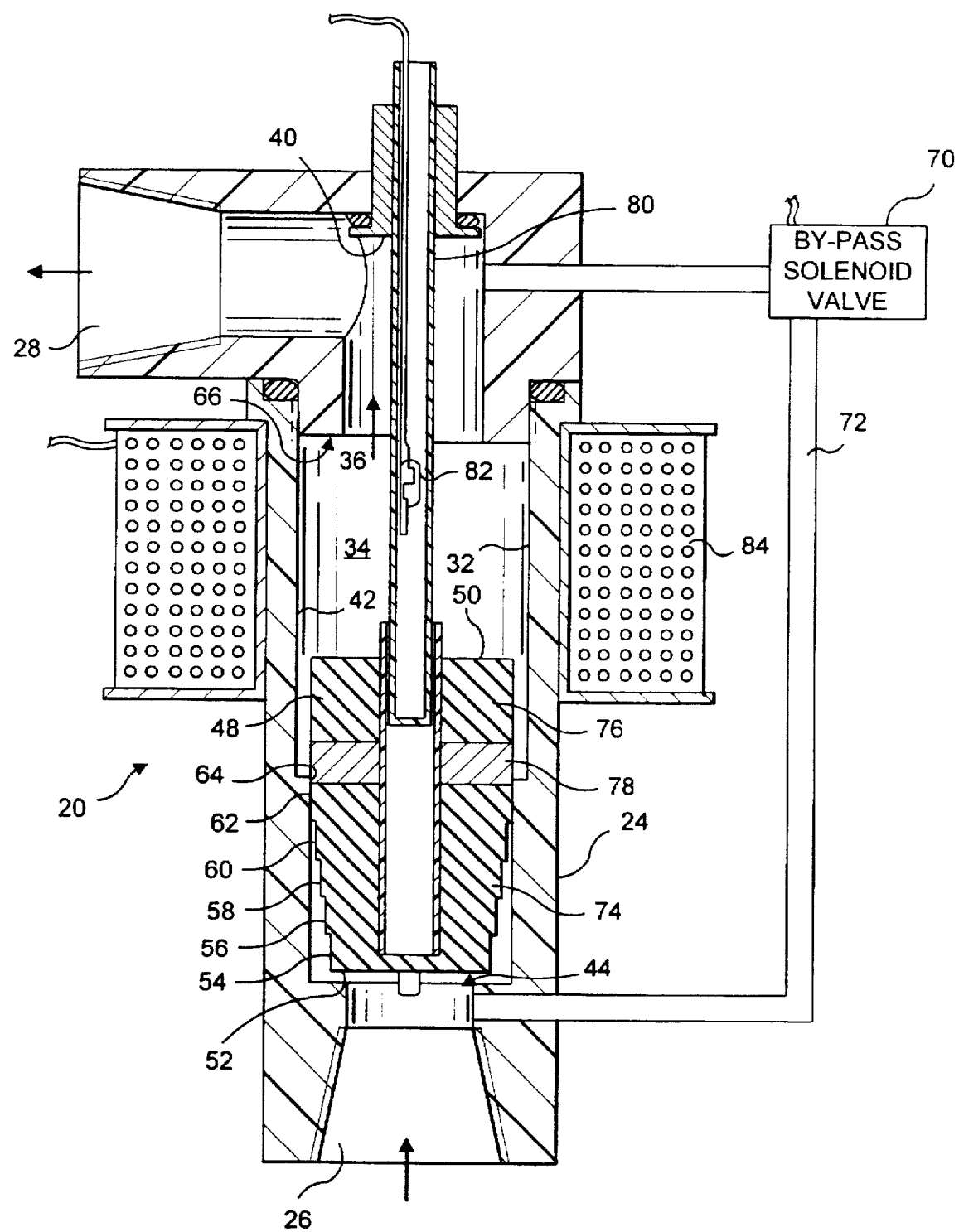
F I G. 2

THRESHOLD FLOW 1.5 OPM

SHUT OFF 5,794,653

1

WATER SHUT-OFF VALVE AND CONTROL SYSTEM

BACKGROUND OF THE INVENTION

1. Field of the Invention

The invention relates to methods and apparatus for shutting off water flow in a water distribution system upon the occasion of flow exceeding established normal limits, such as occurs with a burst conduit.

2. Brief Description of Related Art

The art is replete with descriptions of methods and apparatus for monitoring water distribution lines for unusual flow patterns. A variety of methods have also been described for shutting down water distribution lines when there are indications of an unwanted flow. Representative of the descriptions found in the literature are those given in U.S. Pat. Nos. 4,180,088; 4,249,565; 4,589,435; 4,911,200; 4,926,901; 5,000,224; 5,004,014; 5,056,554; 5,090,436; and 5,267,587. No single system described in the literature meets all of the criteria for an ideal, problem-free low maintenance system. For example, the U.S. Pat. No. 4,180,088 to Mallett discloses a water distribution shutoff system incorporating a flow sensing valve which detects flow in a water distribution line and electrically energizes a line valve to close. An on/off control switch in the electrical sensing circuit permits the system to be conveniently turned off and on. The water shut-off system of Mallett is responsive to flow in the distribution line and is connected to a selecting switch so that the switch can be turned to a position wherein water can flow, and also switched to a safety position wherein flow of water depends on the water system valve. A disadvantage with the Mallett apparatus is that the device does not continually monitor water flow through the valve, thus requiring the householder to set the valve to the safety position for detection.

An improvement over the apparatus of Mallett is found in the U.S. Pat. Nos. 4,249,565 (Brust) and 4,589,435 (Aldrich) which incorporated timing sequences for shut-off of water flow after a predetermined measured period of time. The apparatus disclosed, however, employs fairly expensive components, such as a disk gate valve and an electronic sensor probe and circuit. The apparatus there disclosed exhibits the further disadvantage of allowing the water to again commence flowing if power is interrupted after shut off even though the leak in the system may not have been repaired. U.S. Pat. No. 4,518,955 discloses a very complex flow detection system utilizing a microcomputer to monitor the time that flow takes place, the duration of the detected flow, the intensity of the detected flow, and information about what fluid drains of the system are closed. This system simply is over-sophisticated and uneconomical for an ordinary household.

Van de Moortele in his U.S. Pat. No. 4,522,229 discloses a completely hydromechanical safety device for terminating unwarranted water flow. Again, the device appears to be too complex and costly for average household use.

There continues to be a need for an inexpensive, but reliable system and apparatus for shutting off the flow of water in a residence environment, in the event that abnormal flow conditions are encountered. The present invention meets this need, and provides a system with few moving parts, which are not subject to corrosion by interface with the water in the system. Accordingly, it is easy to maintain at relatively low cost.

SUMMARY OF THE INVENTION

The invention comprises a water distribution system, which comprises;

2

(a) a water flow inlet from a water feed source;
(b) a water flow outlet at a point of water distribution;
(c) first valve means connected to the water flow outlet for controlling water distribution;
(d) conduit means for carrying water flow under super-atmospheric pressure from the inlet to the outlet; and
(e) second valve means for controlling water flow in the conduit means, located in the conduit means between the inlet and the outlet, said second valve means comprising;

(1) a non-magnetic valve housing having an internal wall defining a vertical, fluid tight water flow path between a housing inlet and a housing outlet; the housing inlet being in fluid communication with the water flow inlet and the housing outlet being in fluid communication with the water flow outlet;

(2) a valve seat on the housing internal wall positioned around the flow path between the housing inlet and the housing outlet;

(3) an aperture in the housing on an axial line with the water flow path;

(4) tubular shaft means mounted in the aperture on an axis extending in the longitudinal direction of the flow path, said shaft means having a first end extending out of the housing, and a second end terminating within the housing, and a tube lumen extending between shaft first and second ends;

(5) an electromagnetically responsive, water-flow responsive valve body slidingly mounted on the tubular shaft means to move from a first, valve open position to a second, valve closed position, said body being adapted by size and configuration to sealingly mate with the valve seat when moved to the second position on the tubular shaft means, said body being responsive to water flow along the flow path to move to the first position on the tubular shaft means and responsive to the force of gravity in the absence of water flow along the flow path, whereby said body moves to the second position in the absence of water flow along the water flow path;

(6) valve body stop means disposed in the housing for limiting movement of the valve body in a direction along the tubular shaft means beyond the first position and above the second position;

(7) actuator means comprising a first part fixedly mounted on the valve body and a cooperating second part slidingly mounted in the lumen between the tubular shaft means first and second ends;

(8) a stationary stator mounted on the outside of the internal wall of the housing and outside of the water flow path, between the valve seat and the stop means; and (f) control means for energizing and de-energizing the stationary stator, operable by the actuator means when the valve body moves from the first position to the second position and the second position to the first position.

The advantage of the system of the invention is its simplicity, reliable operation and economy of manufacture and operation.

BRIEF DESCRIPTION OF THE DRAWINGS

FIG. 2 is a cross-sectional side elevation of the valve means for controlling unwanted water flow in the system of FIG. 1, shown in no-flow condition.

3

Figure 3:
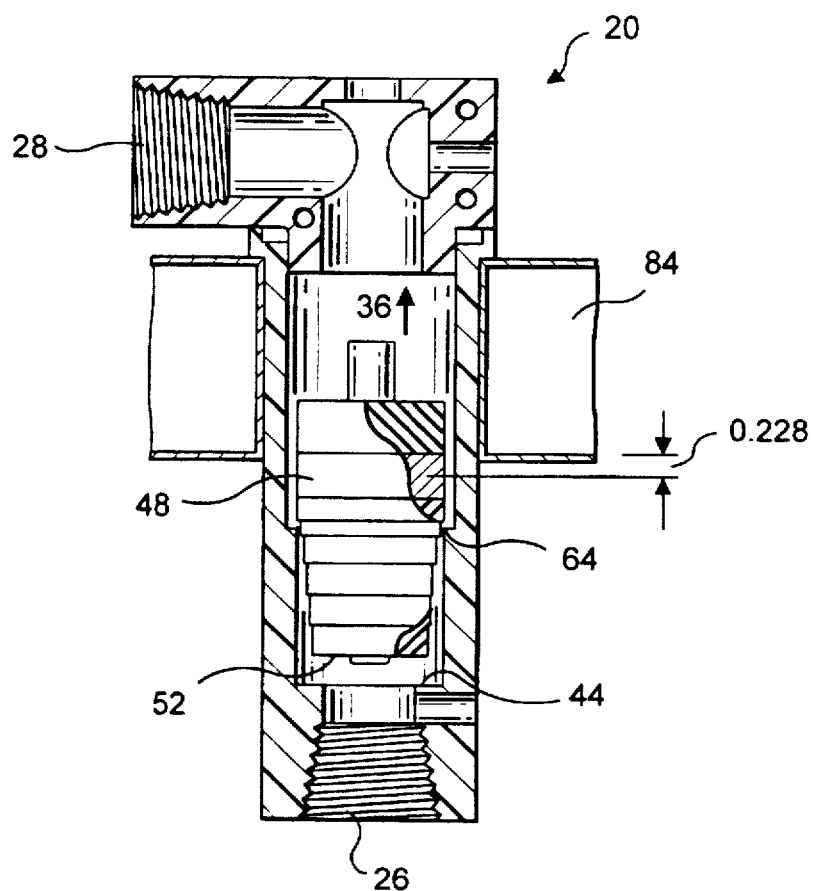
Figure 4:
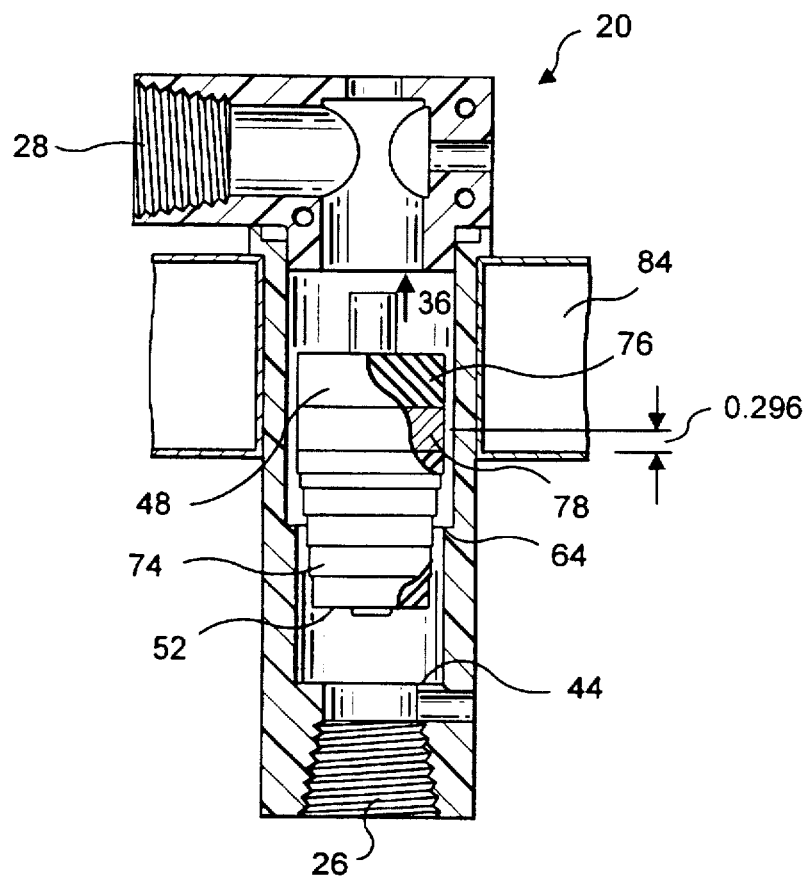
Figure 5:
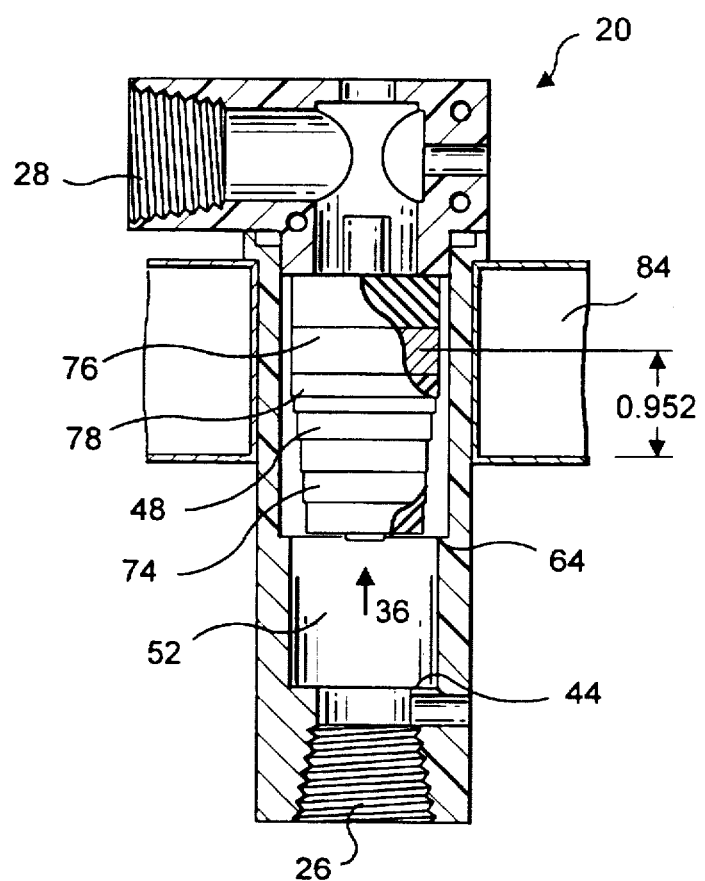

FIGS. 3–5 are views as in FIG. 2, but during flow of water in the system.

Figure 6:
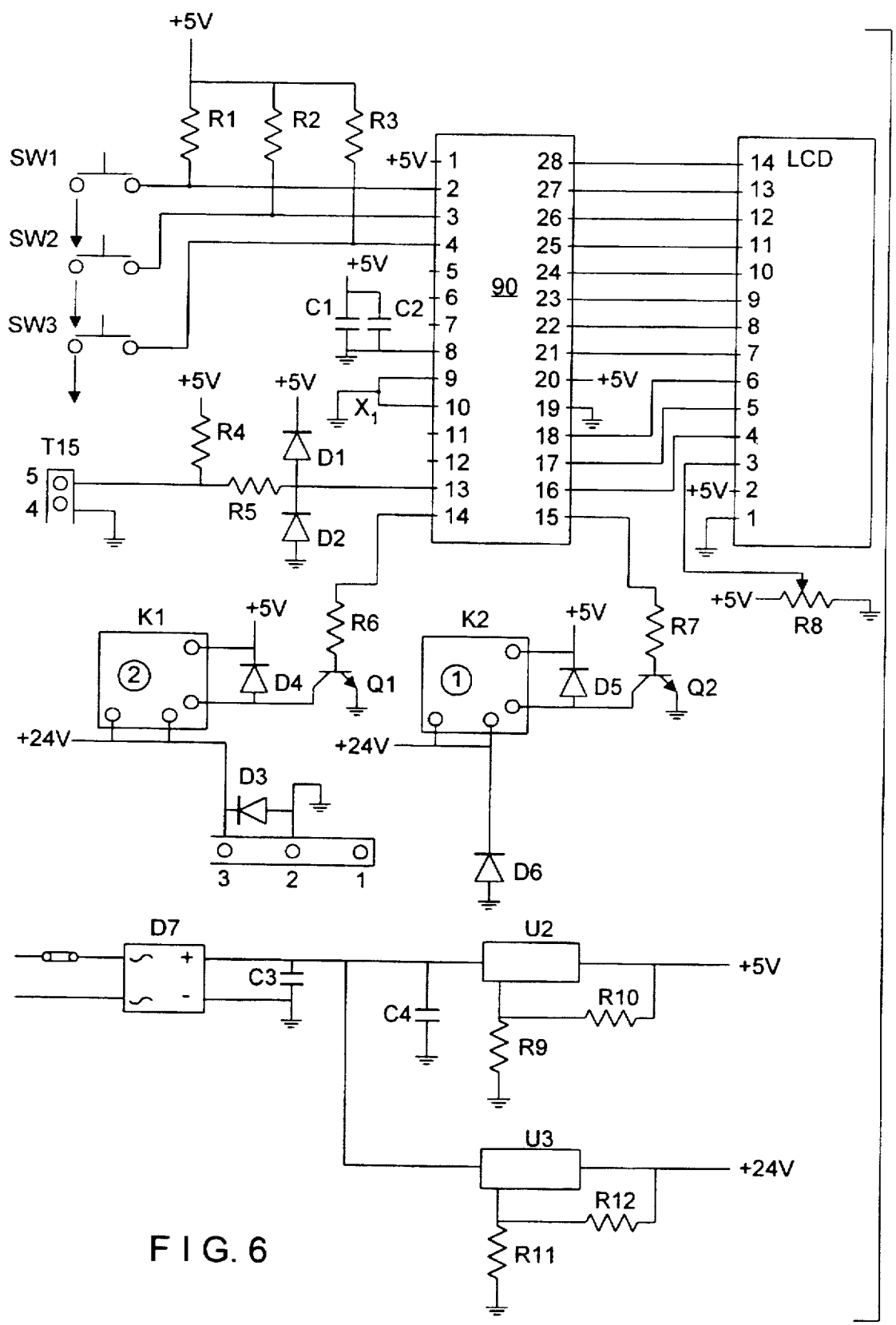

FIG. 6 is a schematic diagram of the electrical circuit means controlling and controlled by the valve of FIG. 2.

Figure 7:
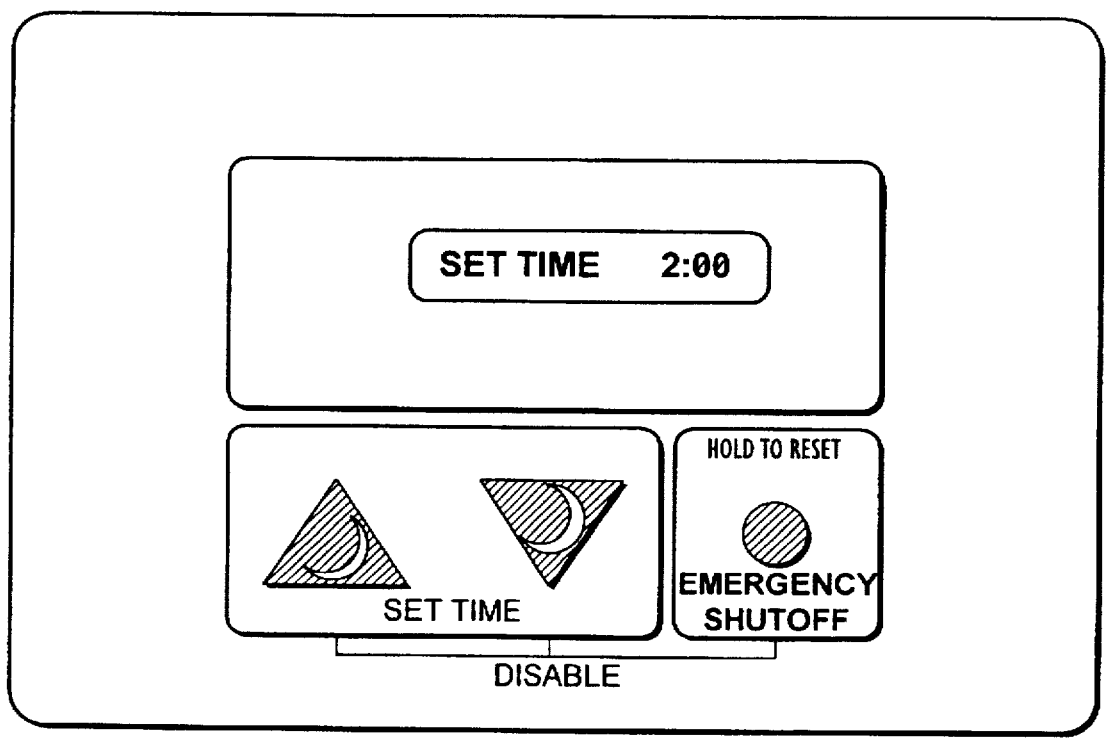

FIG. 7 is an illustration of a representation touchpad control for the valve of the invention.

Figure 8:
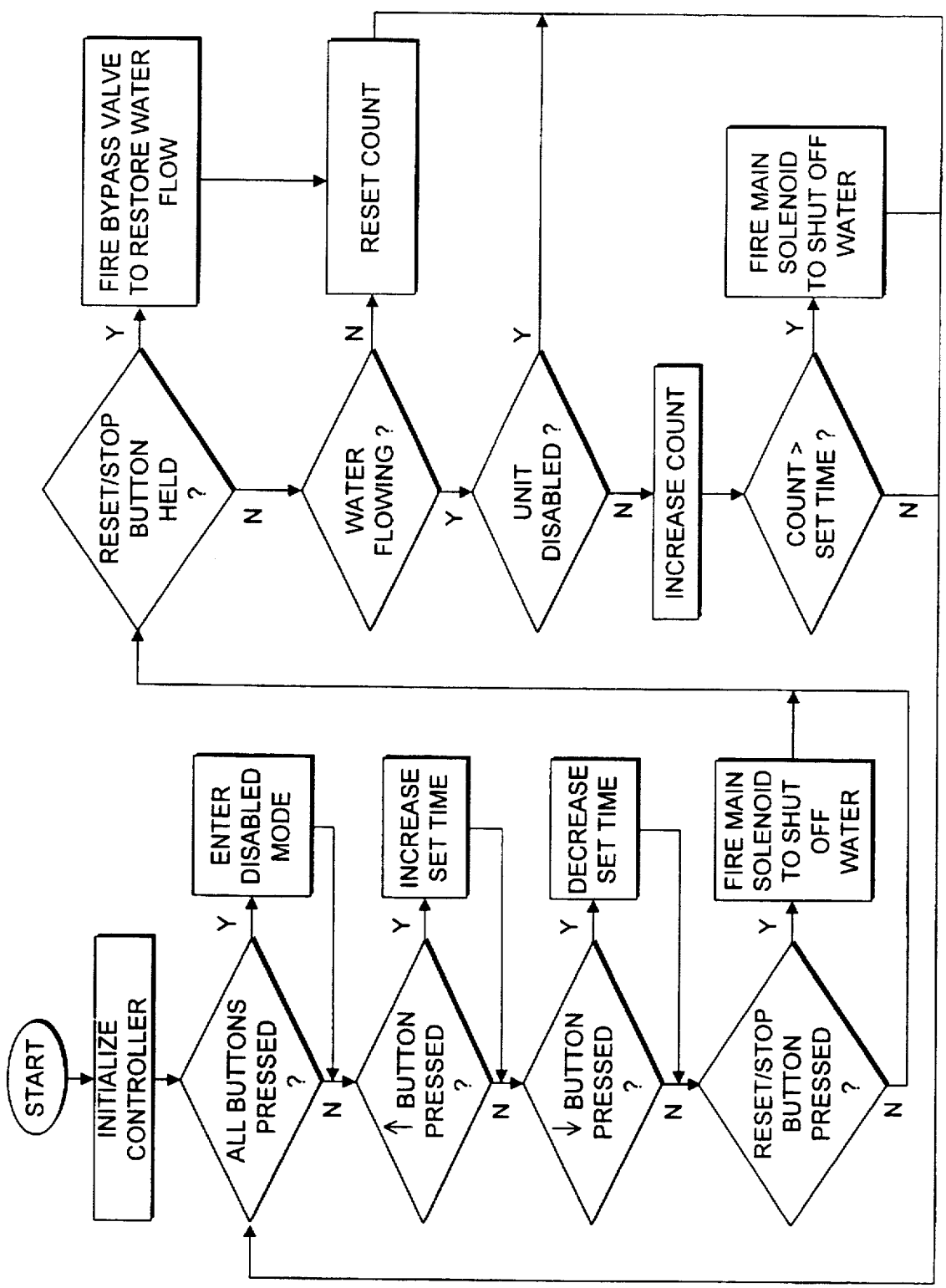

FIG. 8 is a schematic flow chart of the software to operate the touchpad of FIG. 7.

DETAILED DESCRIPTION OF THE PREFERRED EMBODIMENTS OF THE INVENTION

Those skilled in the art will gain an appreciation of the invention from a reading of the following description when viewed with the accompanying drawings of FIGS. 1–6, inclusive. The individual reference characters designate the same or similar elements throughout the drawings.

Figure 1:
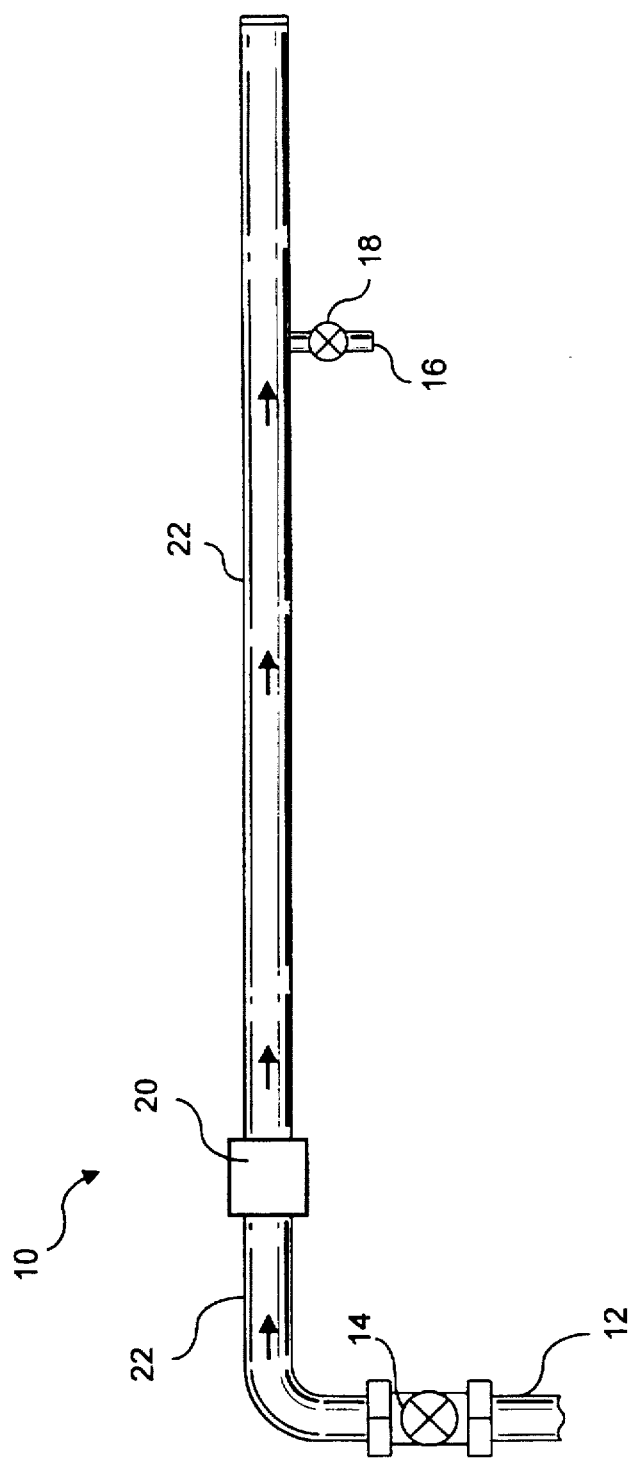
FIG. 1 is a schematic drawing of the water distribution system of the invention.

FIG. 1 is a schematic view of a water distribution system 10 which comprises a water service feed source 12, a valved system inlet 14 and at least one outlet 16 at a point of valved 18 water use. Between, the inlet 14 and the outlet 16, advantageously proximal to inlet 14 is a valve means 20 (schematically) for controlling unwanted water flow in the conduit means 22, which conduit means interconnects the inlet 12 to the outlet 16 and valve means 20. The arrows show the direction of water flow under super-atmospheric pressures during use.

Valve means 20 is shown in a cross-sectional side view in FIG. 2 in a no-flow condition (water not flowing). In this condition, valve 18 and other valves in the system controlling a distribution (see FIG. 1) are closed. The valve means 20 comprises a non-magnetic housing 24 having a housing inlet 26 and a housing outlet 28. The arrows show direction of normal water flow through the housing 24. The housing 24 may be fabricated from any non-magnetic material. Advantageously for example, a synthetic polymeric resin such as polyvinyl chloride, polyethylene, polybutylene, polycarbonate and the like is employed. The housing 24 defines between inlet 26 and outlet 28 a valve chamber 34 which defines a vertically oriented flow path 36. By "vertically oriented" we mean that the chamber 34 is elongate and disposed on an axial line substantially perpendicular to the horizon when installed in a system. The chamber 34 is fluid-tight and closed, except for inlet 26, outlet 28 and an aperture 40 in axial alignment with the center vertical line of flow path 36, and at the top of valve chamber 34.

Integral with the interior wall 42 of the housing 24 is a valve seat which functions as a siphon seal 44 and which circumscribes a peripheral portion of inner wall 32 near or proximal to the lower end of flow path 36 proximal the inlet 26 site. As shown in FIG. 2, the outer periphery of the bottom face 52 of a valve body 48 is seated on siphon seal 44, interrupting the flow path 36 and fluid communication between inlet 26 and outlet 28. This occurs when there is no water flow in the system 10. The force of gravity normally pulls valve body 48 onto siphon seal 44 when there is no water flow along flow path 36. The valve body 48 has a specific gravity greater than 1.0 so that it seats by the force of gravity, absent water flow pressure on valve body 48 bottom face 52, which occurs when there is no flow of water in system 10 from inlet 12 to outlet 14 (refer again to FIG. 1). Advantageously, valve body 48 has a density greater than 1.0 so that it will lift off siphon seal 44 when there is a minimal threshold water flow in the flow path 36.

The system 10 of the invention operates as follows. Referring again to FIG. 2, the valve means 20 is shown in a "no-flow" condition. Valve body 48, responsive to the force of gravity, sits on siphon seal 44, interrupting communication between inlet 12 and outlet 14 and preventing back-flow out of the system 10. The body 48 responds to upward water flow in the flow path 36 when, for example, valve 16 in system 10 is opened for water distribution and use, by lifting off siphon seal 44, establishing open communication between inlet 12 and outlet 14. The response of body 48 is to rise vertically in chamber 34, a distance dependent upon the volume of water flow called upon by opening of valve 16 and/or other valves distributing water from system 10.

As also shown in FIG. 2, the valve body 48 is generally conical and does not have a uniform diameter between the faces 50, 52. Instead, the valve body 48 is stepped in a series of setbacks 54, 56, 58, 60, 62 created by increasing the valve body 48 diameter sequentially at the respective setbacks. Each setback mates with an internal ring 64 integral with and circumscribing the housing 24 interior wall 32, so that as valve body 48 rises along the axial flow path 36, the restriction between a step 54, 56, 58, 60 and ring 64 is sequentially opened.

The purpose of the step structure for the conical valve body 48 can be seen from viewing the FIGS. 3–5, inclusive, which depict various positions of valve body 48 along the vertical flow path 36, depending on the flow force of water lifting the valve body 48 off siphon seal 44. Each step may correspond with discrete settings on a remote controller. FIG. 3 is a view as shown in FIG. 2, but with a threshold flow in system 10 (for example less than about 0.5 pint/minute in a ½" conduit 22 at a service pressure of 30–70 psi). The space between a given step and restriction ring 64 (circumscribing the interior wall 32 of housing 24) allows this threshold flow in system 10. Referring now to FIG. 4, a view as in FIGS. 2 and 3 but with the valve body 48 moved further upward by an increased flow of about 5 gallons/minute. The step 58 mates with the restriction ring 64 to allow the higher flow of water. At each upward movement of valve body 48, the space between a step 54, 56, 58, 60 (in sequence) and restriction ring 64 increases, to allow for greater flow of water from inlet 26 to outlet 28. The number of steps and the distance between steps may be adjusted to accommodate a variety of water flow volumes, in finite control.

FIG. 5 is a cross-sectional side view as in FIGS. 2–4, but shows the position of valve body 48 when a maximum desired flow has been exceeded in system 10, perhaps by an unwanted event such as the bursting of conduit 22. When this occurs, the valve body 48 rises to a maximum height along flow path 36, to engage with a stop 66. Stop 66 is in fact a valve seat, receiving the outer periphery of face 50 of valve body 48. This closes and seals communication between inlet 26 and outlet 28 and halts continued flow in system 10. With the difference in pressure between the water in system 10 and below the valve body 48, valve body 48 remains against the stop 66 until the pressures are again equalized; whereupon valve body 48 will drop down to again permit flow (FIGS. 3–4) or re-seat on siphon seal 44 (FIG. 2).

In operation, if the flow of water in system 10 exceeds a set, pre-determined value (as will be discussed hereinafter) the valve body 48 will move to engage stop 66 as described above. This stops continued flow in system 10. To re-establish flow in system 10, an operator can activate a solenoid valve 70 from a control panel, to open by-pass conduit 72, thereby by-passing the valve means 20 described above, and re-establishing a fluid communication between inlet 26 and outlet 28. With pressures above and below valve body 48 equalized, valve body 48 will again fall and seat itself on siphon seal 44 until solenoid valve 70 is activated to close by-pass conduit 72. Without intervention by an operator, the valve body 48 will not fall and open communication. The unwanted flow is halted.

As shown in FIGS. 2-5, valve body 48 is advantageously constructed in three joined sections. The lower section 74 is preferably fabricated of low density polyethylene or a like resin, as is the upper section 76. A mid-section 78 is advantageously magnetic material, the function of which will be described more fully hereinafter. The valve body 48 as shown in FIGS. 2-5 is slidingly mounted on the shaft of hollow tube 80 and slides thereon along the central axial flow path 36 in movement as described above. The tube 80 fabricated of non-magnetic material is mounted in the aperture 40, closing the aperture 40. Mounted in the lumen of tube 80 is half (a part) of an actuator means such as a magnetic relay or reed switch 82. The switch 82 can be positioned (raised or lowered) within the lumen of tube 80 and the shaft of tube 80 in which the reed switch 82 is mounted is adjustable up and down during installation of valve means 20 to set maximum allowable flow to be monitored. Raising the height of the switch 82 permits a higher flow of water along path 36 before the actuater means described below functions. Duration of the allowable flow may be set on a remote key pad connected to a timed delay circuit in the valve 20 electrical system. For instance, the user may want the valve 20 to detect flow of ½ pint per minute and shut the water off if this amount of flow continues for 2 hours. The flow rate is set by the switch 82 height. The time, for example, 2 hours, is manually set on the touch keypad. This will permit high flow for showers, washing machines, etc., but will shut the system off if any flow in excess of ½ pt./minute continues at the end of 2 hours. The keypad will allow user override and reset after leak repair. When the valve body 48 rises in chamber 34, and the magnetic section 78 (the other half of the actuator means) comes within operational range of switch 82, it closes an electrical circuit which includes stationary stator 84 mounted on the exterior of housing 24 and any optional time delay mechanism as described above. When activated, the stator 84 will lift valve body 48 to a closed position (FIG. 5). Stator 84 is not de-energized until other controls described above and hereinafter take effect.

The operation of system 10 in the event of an unwanted volume of water flow, after shut-down, as shown in FIG. 5 is as follows. Movement of valve body 48 upward in chamber 34 towardstop 66, aside from closing the valve means 20, brings the magnetic material portion 78 of valve body 48 into operational proximity of the reed switch 82. Under the influence of magnetic material portion 78, reed switch 82 closes an electrical circuit to energize stationary stator 84. When energized, stator 84 lifts the valve body 48 in place against stop 66 through its holding influence upon the magnetic material portion 78 of the valve body 48. The pressure differential thereby caused between 28 and 26 will now hold 48 against 66 whether or not 84 continues to be actuated. In summary, the valve body serves as both a flow sensing member and the armature to effect shutoff by energizing the station. In a preferred embodiment of the invention, the electrical circuit to energize stationary stator 84 may include a time delay mechanism, so that the valve body 48 is not held in place by stator 84, unless the demand for excessive flow exceeds a programmed and predetermined time period. This would allow for using high volumes of flow in the system 10 for brief periods without shut-down of the system. Momentary interruption of the water flow in system 10 will lower the flow rate and drop valve body 48 to an open-flow position.

Referring now to FIG. 6 of the accompanying drawings, embodiment electrical control circuitry and controls are set forth in detail. A microprocessor 90 is supplied by a power supply which has as the input the 24 volt A.C. output of a step-down transformer. The A.C. current from the transformer is rectified by diode bridge D-7 and filtered by band filter C3. The 5-volt power supply for the logic circuitry is regulated by U2, C4, R9 and R10. The 24 volt power supply for the solenoids is regulated by U3, R1 and R2. Electrically connected to the microprocessor 90 is a liquid crystal display (LCD) and a resonator (X-1). The microprocessor 90 advantageously is a commercially available PIC16C62A (Microchip Corp.).

The front panel switches SW1-SW3 and their pullup resistors R1-R3 provide user input to the microprocessor 90. The flow switch input is pulled up by R4 and clamped to +5V and GND by R5, D1 and D2. The bypass solenoid 70 is activated by R6, Q1, K1, D3 and D4. The shutoff solenoid is activated by R7, Q2, K2, D5 and D6. The LCD display contrast is controlled by R8.

As mentioned above, a user touch keypad may be placed at any convenient location. It may be hardwired or linked through the 110 v power line. The touch pad allows the user to bypass the system, turn the water off and on and program daily usage times (i.e., there may be days of the week on which lawn irrigation may require periods of 3 or 4 hours continuous usage). The keypad includes a liquid crystal display (LCD) which indicates day, time and water setting. Keys include system off, on, reset, up/down setting for time and flow, at home and away positions.

There is no physical contact between the controls and the internal structure of the valve 20, avoiding corrosion problems.

The valve 20 responds to a catastrophic leak or line break instantly. Even in the event of a power failure. In a typical residence environment, the valve 20 will close when flow exceeds an upper set point of any desired limit, for example of about 2.5 gal/min.

It is to be understood that the conduit 22 will be full at all times in a normal distribution system 10. However, the rate of flow could be highly variable. In the afore-described embodiment of the device the normal application uses a utility meter that has a rating of 15 gallons an hour. These devices are 97-98% accurate above a half-gallon-a- minute rate of flow, which translates to about 30 gallons an hour.

Those skilled in the art will appreciate that many modifications of the preferred embodiments described above may be made without departing from the spirit and the scope of the invention. For example, the microprocessor 90 may be used in conjunction with a touchpad control such as shown in FIG. 7. The touchpad shown in Figure can be operated with software shown schematically in the flow chart of FIG. 8. This software protects against water leaks by shutting off the water if a pre-determined flow is detected for more than a set period of time. The time may be changed to any value between one minute and four hours by pressing the up or down arrow buttons. When the pre-determined flow continues past the set time, the main shut off solenoid will activate for two seconds, closing the system. Water may also be shut off by pressing the Emergency shutoff button. Water flow is restored by pressing the emergency Shutoff button and holding for five seconds. This will activate the bypass valve for 30 seconds, restoring the system pressure and releasing the main shutoff.

The unit may be disabled by pressing all three front panel buttons.

Displayed Messages

The following messages are displayed on LCD display (FIG. 7).

Set Time 2:00 This message is displayed when water flow is not detected. The actual set time may be adjusted to any value.

Water Flowing Shutoff in . . . 1:59:59 value These messages display when water flow exceeds the pre-determined Water is off Displayed when the water has been shut off.

Resetting Displayed during the 30 second reset cycle.

Disabled Displayed when the FloSentry has been disabled.

Unit Disabled Displayed when water flow exceeds the pre-determined value and the unit has been disabled.

What is claimed is:

1. A water distribution system, which comprises:
   (a) a water flow inlet from a water feed source;
   (b) a water flow outlet at a point of water distribution;
   (c) first valve means connected to the water flow outlet for controlling water distribution;
   (d) conduit means for carrying water flow under super-atmospheric pressure from the inlet to the outlet; and
   (e) second valve means for controlling water flow in the conduit means, located in the conduit means between the inlet and the outlet, said second valve means comprising;
     (1) a non-magnetic valve housing having an internal wall defining a vertical, fluid tight water flow path between a housing inlet and a housing outlet; the housing inlet being in fluid communication with the water flow inlet and the housing outlet being in fluid communication with the water flow outlet;
     (2) a valve seat on the housing internal wall positioned around the flow path between the housing inlet and the housing outlet;
     (3) an aperture in the housing on an axial line with the water flow path;
     (4) tubular shaft means mounted in the aperture on an axis extending in the longitudinal direction of the flow path, said shaft means having a first end extending out of the housing, and a second end terminating within the housing, and a tube lumen extending between shaft first and second ends;
     (5) an electromagnetically responsive, water-flow responsive valve body slidingly mounted on the tubular shaft means to move from a first, valve open position to a second, valve closed position, said body being adapted by size and configuration to sealingly mate with the valve seat when moved to the second position on the tubular shaft means, said body being responsive to water flow along the flow path to move to the first position on the tubular shaft means and responsive to the force of gravity in the absence of water flow along the flow path, whereby said body moves to the second position in the absence of water flow along the water flow path;
     (6) valve body stop means disposed in the housing for limiting movement of the valve body in a direction along the tubular shaft means beyond the first position and above the second position;
     (7) actuator means comprising a first part fixedly mounted on the valve body and a cooperating second part slidingly mounted in the lumen between the tubular shaft means first and second ends;
     (8) a stationary stator mounted on the outside of the internal wall of the housing and outside of the water flow path, between the valve seat and the stop means; and
   (f) control means for energizing and de-energizing the stationary stator, operable by the actuator means when the valve body moves from the first position to the second position and the second position to the first position.

2. The system of claim 1 wherein the water feed source provides water flow under a pressure of from about 30 to about 70 psi.

3. The system of claim 1, wherein the tubular shaft means is fabricated from non-magnetic materials.

4. The system of claim 1 wherein the valve body includes a portion which is fabricated from magnetic material.

5. The system of claim 1 wherein a portion of the valve body is fabricated from low density polyethylene.

6. The system of claim 1 wherein the actuator means comprises magnetic material associated with the valve body and a magnetic relay reed switch positioned within the lumen of the tubular shaft means.

7. The system of claim 6 wherein the stator is energized by closing of the reed switch.

8. The system of claim 1 which further comprises a by-pass conduit around the second valve means.

9. The system of claim 8 wherein the by-pass conduit is opened and closed by a solenoid valve.

10. The system of claim 1 wherein the valve body is generally conical with a stepped profile, the steps being of narrower diameter from top to bottom in sequence.

11. The system of claim 1 wherein the actuator means includes a magnetic relay reed switch adjustable in position within the lumen of the tubular shaft means.

12. A valve which comprises;
   (1) a non-magnetic valve housing having an internal wall defining a vertical, fluid tight water flow path between a housing inlet and a housing outlet; the housing inlet being in fluid communication with the water flow inlet and the housing outlet being in fluid communication with the water flow outlet;
   (2) a valve seat on the housing internal wall positioned around the flow path between the housing inlet and the housing outlet;
   (3) an aperture in the housing on an axial line with the water flow path;
   (4) tubular shaft means mounted in the aperture on an axis extending in the longitudinal direction of the flow path, said shaft means having a first end extending out of the housing, and a second end terminating within the housing, and a tube lumen extending between shaft first and second ends;
   (5) an electromagnetically responsive, water-flow responsive valve body slidingly mounted on the tubular shaft means to move from a first, valve open position to a second, valve closed position, said body being adapted by size and configuration to sealingly mate with the valve seat when moved to the second position on the tubular shaft means, said body being responsive to water flow along the flow path to move to the first position on the tubular shaft means and responsive to the force of gravity in the absence of water flow along the flow path, whereby said body moves to the second position in the absence of water flow along the water flow path;

(6) valve body stop means disposed in the housing for limiting movement of the valve body in a direction along the tubular shaft means beyond the first position and above the second position;

(7) actuator means comprising a first part fixedly mounted on the valve body and a cooperating second part slidingly mounted in the lumen between the tubular shaft means first and second ends;

(8) a stationary stator mounted on the outside of the internal wall of the housing and outside of the water flow path, between the valve seat and the stop means; and (f) control means for energizing and de-energizing the stationary stator, operable by the actuator means when the valve body moves from the first position to the second position and the second position to the first position.

13. The valve of claim 12 wherein the valve body comprises concentric stepped diameters each mating with the valve seat to correspond to a specific flow rate.

* * * * *